United States Patent [19]
Yoneyama et al.

[11] Patent Number: 5,999,823
[45] Date of Patent: Dec. 7, 1999

[54] CELLULAR CORDLESS TELEPHONE

[75] Inventors: Masayoshi Yoneyama; Hirotaka Yamada, both of Yokohama, Japan

[73] Assignee: Matsushita Electric Industrial Co., Ltd., Osaka, Japan

[21] Appl. No.: 08/865,618

[22] Filed: May 30, 1997

[30] Foreign Application Priority Data

Jul. 18, 1996 [JP] Japan ..................................... 8-206402
Aug. 23, 1996 [JP] Japan ..................................... 8-240024

[51] Int. Cl.⁶ .............................. H04Q 7/00; H04Q 7/30
[52] U.S. Cl. ......................... 455/552; 455/552; 455/553; 455/515
[58] Field of Search .................................. 455/552, 553, 455/502, 515, 560

[56] References Cited

U.S. PATENT DOCUMENTS

| | | |
|---|---|---|
| 4,989,230 | 1/1991 | Gillig et al. . |
| 5,127,042 | 6/1992 | Gillig et al. ............................. 455/552 |
| 5,406,615 | 4/1995 | Miller, II et al. ....................... 455/552 |
| 5,442,680 | 8/1995 | Schellinger et al. .................... 455/426 |
| 5,533,099 | 7/1996 | Byrne ..................................... 455/552 |
| 5,550,895 | 8/1996 | Burson et al. .......................... 455/552 |

Primary Examiner—Dwayne D. Bost
Assistant Examiner—Alan Gantt
Attorney, Agent, or Firm—Pollock, Vande Sande & Amernick

[57] ABSTRACT

A cellular cordless telephone set includes an antenna being common to cellular telephone and cordless telephone, and a radio transceiver connected to the antenna and being common to cellular telephone and cordless telephone. The radio transceiver is changeable between a cellular telephone mode of operation and a cordless telephone mode of operation. The radio transceiver receives an incoming cellular telephone radio signal from the antenna and feeds a transmission cellular telephone radio signal to the antenna during the cellular telephone mode of operation. The radio transceiver receives an incoming cordless telephone radio signal from the antenna and feeds a transmission cordless telephone radio signal to the antenna during the cordless telephone mode of operation. The incoming cellular telephone radio signal and the transmission cellular telephone radio signal are in a first predetermined frequency band. The incoming cordless telephone radio signal and the transmission cordless telephone radio signal are in a second predetermined frequency band adjacent to the first predetermined frequency band.

2 Claims, 6 Drawing Sheets

CELLULAR CORDLESS TELEPHONE

BACKGROUND OF THE INVENTION

1. Field of the Invention

This invention relates to a cellular cordless telephone which can be used in both a cellular system and a cordless system.

2. Description of the Related Art

U.S. Pat. No. 4,989,230 discloses a cellular cordless telephone which operates with both a cordless base station and a cellular base station. One embodiment of the cellular cordless telephone includes a cellular transceiver, a cordless transceiver, an antenna for cellular radio channels, and an antenna for cordless radio channels. Another embodiment of the cellular cordless telephone includes a cellular telephone, a cordless telephone transceiver, an antenna for cellular radio channels, and an antenna for cordless radio channels. Whenever the cellular cordless telephone is within a range of the cordless base station, telephone calls may be made over the cordless radio channel or transferred from the cellular radio channels to the cordless radio channel. If the cellular cordless telephone thereafter moves out of the range of the cordless base station, telephone calls may be made over the cellular radio channels or transferred from the cordless radio channel to one of the cellular telephone channels.

U.S. Pat. No. 4,989,230 indicates that the cordless radio channels are in the frequency band from 46 MHz to 49 MHz while the cellular radio channels are in the frequency band from 824 MHz to 894 MHz.

The cellular cordless telephone of U.S. Pat. No. 4,989,230 has separate radio communication units for a cellular system and a cordless system respectively. Thus, the cellular cordless telephone of U.S. Pat. No. 4,989,230 tends to be large in size and heavy in weight.

In the cellular cordless telephone of U.S. Pat. No. 4,989,230, the two radio communication units consume electric power even when they are in stand-by states. Therefore, the total power consumption rate tends to be high.

SUMMARY OF THE INVENTION

It is an object of this invention to provide an improved cellular cordless telephone.

A first aspect of this invention provides a cellular cordless telephone set comprising an antenna being common to cellular telephone and cordless telephone; a radio transceiver connected to the antenna and being common to cellular telephone and cordless telephone; and means for changing the radio transceiver between a cellular telephone mode of operation and a cordless telephone mode of operation, wherein the radio transceiver receives an incoming cellular telephone radio signal from the antenna and feeds a transmission cellular telephone radio signal to the antenna during the cellular telephone mode of operation, and the radio transceiver receives an incoming cordless telephone radio signal from the antenna and feeds a transmission cordless telephone radio signal to the antenna during the cordless telephone mode of operation; wherein the incoming cellular telephone radio signal and the transmission cellular telephone radio signal are in a first predetermined frequency band, and the incoming cordless telephone radio signal and the transmission cordless telephone radio signal are in a second predetermined frequency band adjacent to the first predetermined frequency band.

A second aspect of this invention is based on the first aspect thereof, and provides a cellular cordless telephone set wherein the incoming cordless telephone radio signal is in a first predetermined frequency range within an ISM frequency band, and the transmission cordless telephone radio signal is in a second predetermined frequency range within the ISM frequency band, the second predetermined frequency range being higher than the first predetermined frequency range.

A third aspect of this invention provides a cellular cordless telephone set comprising a radio transceiver being common to cellular telephone and cordless telephone and being movable into and out of a stand-by state; first means for making the radio transceiver ready to receive either a cellular telephone radio signal or a cordless telephone radio signal when the radio transceiver is in the stand-by state; and second means for, when the radio transceiver is in the stand-by state, changing the radio transceiver between a cellular control message reception mode of operation and a cordless control message reception mode of operation, wherein the radio transceiver receives a cellular control message from a cellular base station during the cellular control message reception mode of operation, and the radio transceiver receives a cordless control message from a cordless fixed set during the cordless control message reception mode of operation.

A fourth aspect of this invention is based on the third aspect thereof, and provides a cellular cordless telephone set wherein the second means comprises means for deciding whether or not plural words in the received cellular control message are equal to each other; and means for changing the radio transceiver from the cellular control message reception mode of operation to the cordless control message reception mode of operation when the plural words in the received cellular control message are equal to each other.

A fifth aspect of this invention is based on the third aspect thereof, and provides a cellular cordless telephone set wherein the cellular telephone radio signal is of an AMPS cellular system, and the cordless telephone radio signal is in an ISM frequency band.

DESCRIPTION OF THE PREFERRED EMBODIMENTS

First Embodiment

Figure 1:
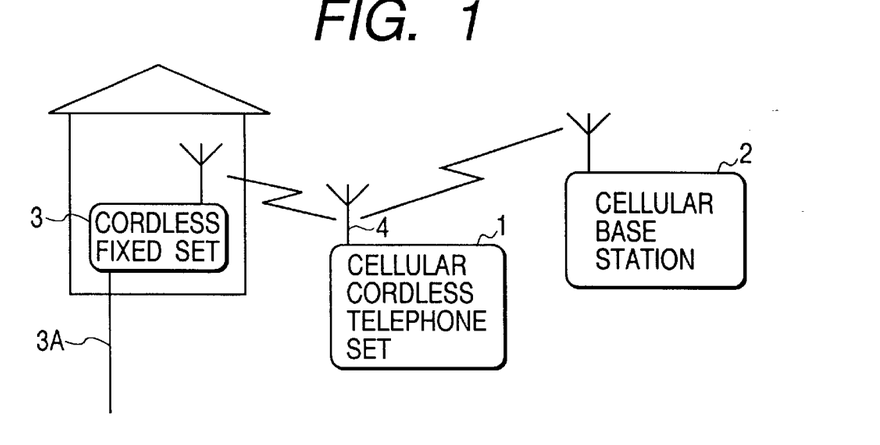
FIG. 1 is a diagram of a cellular cordless telephone system according to a first embodiment of this invention.

With reference to FIG. 1, a cellular cordless telephone set 1 can communicate with a base station 2 of the AMPS (Advanced Mobile Phone Service) cellular system by radio. Thus, a user of the cellular cordless telephone set 1 can talk with an opposite party via the cellular cordless telephone set 1 and the base station 2.

Generally, the cellular cordless telephone set 1 is portable. The cellular radio channels provided in the AMPS cellular system are in the frequency band from 824 MHz to 894 MHz.

Also, the cellular cordless telephone set 1 can communicate with a cordless telephone fixed set 3 by radio. The cordless telephone fixed set 3 is connected to a telephone line 3A. Thus, the user of the cellular cordless telephone set 1 can talk with an opposite party via the cellular cordless telephone set 1 and the cordless telephone fixed set 3. The cordless telephone fixed set 3 is a cordless-system base station or a cordless-system master station. The radio channels provided between the cellular cordless telephone set 1 and the cordless telephone fixed set 3 are in the ISM (industrial scientific and medical equipment) band, that is, the frequency band from 902 MHz to 928 MHz.

Figure 2:
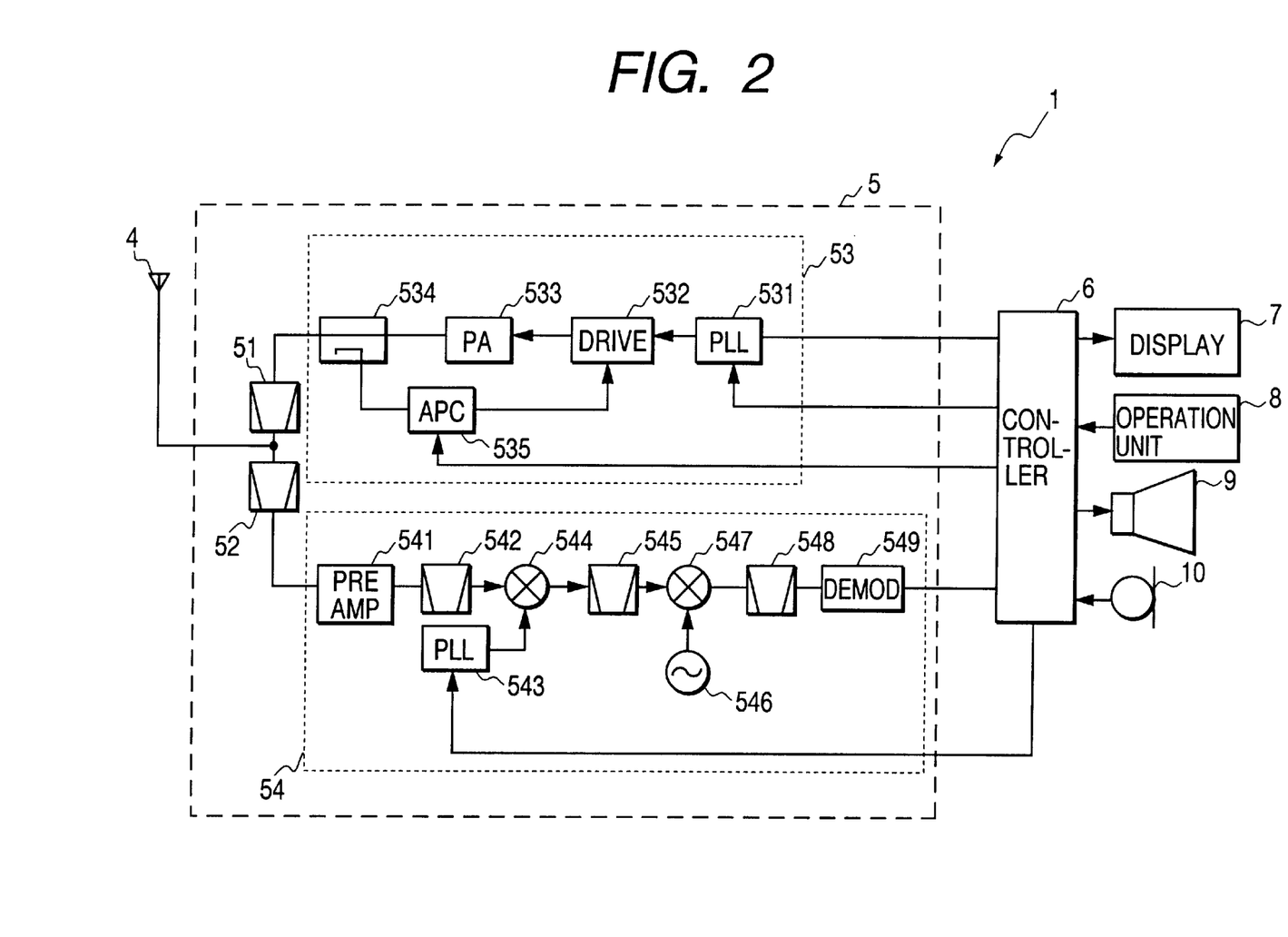
FIG. 2 is a block diagram of a cellular cordless; telephone set in the system of FIG. 1.

With reference to FIGS. 1 and 2, the cellular cordless telephone set 1 has a single antenna 4 and a single radio communication unit (radio transceiver) 5 which are used in both the AMPS cellular system and the ISM cordless system.

As shown in FIG. 2, the cellular cordless telephone set 1 also has a controller 6, a display 7, an operation unit 8, a loudspeaker 9, and a microphone 10.

The radio communication unit 5 is connected between the antenna 4 and the controller 6. The display 7, the operation unit 8, the loudspeaker 9, and the microphone 10 are connected to the controller 6.

The controller 6 includes a microcomputer, a digital signal processor, or a similar device which has a combination of an interface (an I/O port), a processing section, a ROM, and a RAM. The controller 6 operates in accordance with a program stored in the ROM.

As shown in FIG. 2, the radio communication unit 5 includes filters 51 and 52, a transmitter 53, and a receiver 54. The filter 51 is connected between the antenna 4 and the transmitter 53. The filter 52 is connected between the antenna 4 and the receiver 54.

The transmitter 53 and the receiver 54 are connected to the controller 6.

The filter 51 passes a transmission signal in a predetermined transmission band from the transmitter 53 toward the antenna 4. In addition, the filter 51 blocks the travel of a received signal in a predetermined reception band from the antenna 4 toward the transmitter 53.

The filter 52 passes a received signal in the predetermined reception band from the antenna 4 toward the receiver 54. In addition, the filter 52 blocks the travel of a transmission signal in the predetermined transmission band from the transmitter 53 toward the receiver 54.

The microphone 10 converts voice into a corresponding speech signal. The microphone 10 outputs the speech signal to the controller 6. The controller 6 is programmed to control the transmitter 53 in response to the speech signal so that the transmitter 53 will generate a transmission RF signal having voice information represented by the speech signal. The transmission RF signal is of either the AMPS cellular system or the ISM cordless system. The transmission RF signal is fed from the transmitter 53 to the antenna 4 via the filter 51 before being radiated by the antenna 4 toward the cellular base station 2 and the cordless telephone fixed set 3.

An RF signal transmitted from the cellular base station 2 or the cordless telephone fixed set 3 is received by the antenna 4. The received RF signal travels from the antenna 4 to the receiver 54 via the filter 52. The controller 6 is programmed to control the receiver 54 so that the receiver 54 will recover voice information from the received RF signal. The controller 6 feeds the recovered voice information from the receiver 54 to the loudspeaker 9 as a speech signal. The loudspeaker 9 converts the voice information (the speech signal) into corresponding voice.

As shown in FIG. 2, the transmitter 53 includes a PLL (phase locked loop) synthesizer 531, an RF driver amplifier 532, an RF power amplifier 533, a directional coupler 534, and an automatic power controller (APC) 535.

The PLL synthesizer 531 is connected to the controller 6 and the RF driver amplifier 532. The RF driver amplifier 532 is successively followed by the RF power amplifier 533 and the directional coupler 534. The directional coupler 534 is connected to the filter 51. The automatic power controller 535 is connected to the directional coupler 534, the RF driver amplifier 532, and the controller 6.

The controller 6 is programmed to control the PLL synthesizer 531 in response to voice information (a speech signal) and transmission frequency information so that the PLL synthesizer 531 will generate an RF signal resulting from modulation of an RF carrier with the voice information. The frequency of the generated RF signal is determined by the transmission frequency information. The RF signal generated by the PLL synthesizer 531 is successively amplified by the RF driver amplifier 532 and the RF power amplifier 533. The output signal of the RF power amplifier 533 is fed to the directional coupler 534, and is divided into a main portion and a sub portion thereby. The main portion of the RF signal is fed from the directional coupler 534 to the antenna 4 via the filter 51 before being radiated by the antenna 4. The sub portion Df the RF signal is fed from the directional coupler 534 to the automatic power controller 535. The controller 6 is programmed to inform the automatic power controller 535 of a desired power level. The automatic power controller 535 adjusts the gain of the RF driver amplifier 532 in response to the level of the sub portion of the RF signal and the desired power level so that the power level of the output signal of the RF power amplifier 533 will be equal to the desired power level. The RF driver amplifier 532, the RF power amplifier 533, the directional coupler 534, and the automatic power controller 535 form a feedback loop for power control.

Operation of the cellular cordless telephone set 1 can be changed between a cellular telephone mode and a cordless telephone mode by actuating the operation unit 8. The controller 6 is programmed to vary the transmission frequency information in response to whether operation of the cellular cordless telephone set 1 is in the cellular telephone mode or the cordless telephone mode. Accordingly, the frequency of the RF signal generated by the PLL synthesizer 531 depends on whether operation of the cellular cordless telephone set 1 is in the cellular telephone mode or the cordless telephone mode.

As shown in FIG. 2, the receiver 54 includes an RF pre-amplifier 541, an RF band-pass filter 542, a PLL synthesizer 543, a first mixer 544, a first IF band-pass filter 545, a local oscillator 546, a second mixer 547, a second IF band-pass filter 548, and a demodulator 549.

The RF pre-amplifier 541 is connected to the filter 52. The RF pre-amplifier 541 is successively followed by the RF band-pass filter 542, the first mixer 544, the first IF band-pass filter 545, the second mixer 547, the second IF band-pass filter 548, and the demodulator 549. The PLL synthesizer 543 is connected to the first mixer 544 and the controller 6. The local oscillator 546 is connected to the second mixer 547. The demodulator 549 is connected to the controller 6.

The RF pre-amplifier 541 is supplied with a received RF signal of either cellular telephone or cordless telephone from the antenna 4 via the filter 52. The RF pre-amplifier 541 enlarges the received RF signal. The RF band-pass filter 542 receives the output signal of the RF pre-amplifier 541, and removes its components having frequencies outside a desired band. The first mixer 544 receives the output signal of the RF band-pass filter 542. The controller 6 is programmed to generate reception frequency information in response to whether operation of the cellular cordless telephone set 1 is in the cellular telephone mode or the cordless telephone mode. The controller 6 informs the PLL synthesizer 543 of the generated reception frequency information. The PLL synthesizer 543 generates a first local signal in response to the reception frequency information. The frequency of the first local signal depends on the reception frequency information, that is, depends on whether operation of the cellular cordless telephone set 1 is in the cellular telephone mode or the cordless telephone mode. The PLL synthesizer 543 outputs the first local signal to the first mixer 544.

The device 544 mixes the output signal of the RF band-pass filter 542 and the first local signal, thereby converting the output signal of the RF band-pass filter 542 into a first IF signal. The first IF band-pass filter 545 receives the first IF signal from the first mixer 544, and removes its components having frequencies outside a desired band. The second mixer 547 receives the output signal of the first IF band-pass filter 545. The local oscillator 546 outputs a second local signal to the second mixer 547. The device 547 mixes the output signal of the first IF band-pass filter 545 and the second local signal, thereby converting the output signal of the first IF band-pass filter 545 into a second IF signal. The second IF band-pass filter 548 receives the second IF signal from the second mixer 547, and removes its components having frequencies outside a desired band. The demodulator 549 receives the output signal of the second IF band-pass filter 548, and demodulates the output signal of the second IF band-pass filter 548 into voice information (a speech signal). The demodulator 549 outputs the voice information to the controller 6.

Figure 3:
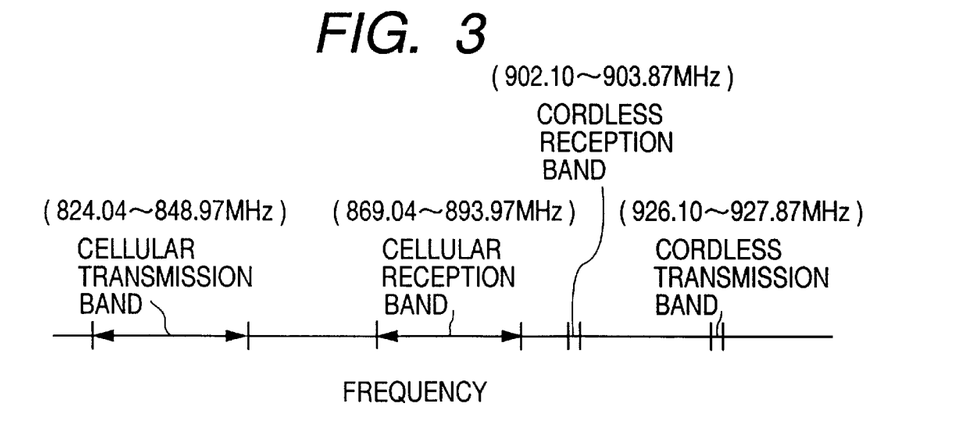
FIG. 3 is a diagram of frequency bands in the system of FIG. 1.

The cellular communication provided between the cellular cordless telephone set 1 and the cellular base station 2 is based on the AMPS cellular system. As shown in FIG. 3, the cellular transmission frequencies (channels) are in the band from 824.04 MHz to 848.97 MHz. The cellular reception frequencies (channels) are in the band from 869.04 MHz to 893.97 MHz. The cordless communication provided between the cellular cordless telephone set 1 and the cordless telephone fixed set 3 uses frequencies (channels) in the ISM band, that is, the band from 902 MHz to 928 MHz. Specifically, the cordless transmission frequencies (channels) and the cordless reception frequencies (channels) are in a predetermined upper range and a predetermined lower range within the ISM band, respectively. In more detail, the cordless transmission frequencies (channels) are in the band from 926.1 MHz to 927.87 MHz while the cordless reception frequencies (channels) are in the band from 902.1 MHz to 903.87 MHz.

Figure 4:
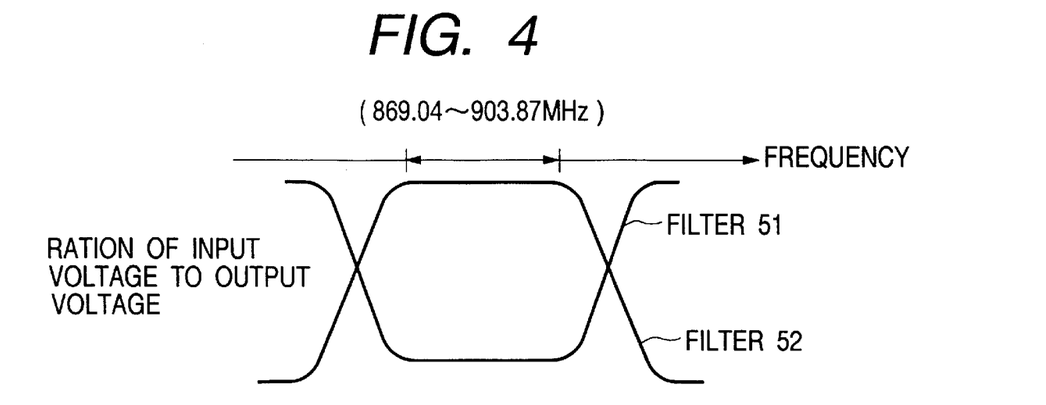
FIG. 4 is a diagram of frequency response curves of filters in FIG. 2.

As shown in FIG. 4, the filter 51 connected to the transmitter 53 cuts off signals having frequencies in a band of 869.04 MHz to 903.87 MHz which contains the cellular reception band (869.04 MHz to 893.97 MHz) and the cordless reception band (902.1 MHz to 903.87 MHz). The filter 51 efficiently conducts signals having other frequencies. The filter 52 connected to the receiver 54 is of the band-pass type. The filter 51 efficiently conducts signals having frequencies in a band of 869.04 MHz to 903.87 MHz. The filter 52 cuts off signals having other frequencies.

The controller 6 is programmed to implement the following processes. During the cellular telephone mode of operation of the cellular cordless telephone set 1, the controller 6 controls the PLL synthesizer 531 so that the frequency of the RF signal generated by the PLL synthesizer 531 will be equal to one out of channels in the cellular transmission band (824.04 MHz to 848.97 MHz). In addition, the controller 6 controls the PLL synthesizer 543 so that the frequency of a signal receivable and acceptable by the receiver 54 will be equal to one out of channels in the cellular reception band (869.04 MHz to 893.97 MHz). On the other hand, during the cordless telephone mode of operation of the cellular cordless telephone set 1, the controller 6 controls the PLL synthesizer 531 so that the frequency of the RF signal generated by the PLL synthesizer 531 will be equal to one out of channels in the cordless transmission band (926.1 MHz to 927.87 MHz). In addition, the controller 6 controls the PLL synthesizer 543 so that the frequency of a signal receivable and acceptable by the receiver 54 will be equal to one out of channels in the cordless reception band (902.1 MHz to 903.87 MHz).

Figure 5:
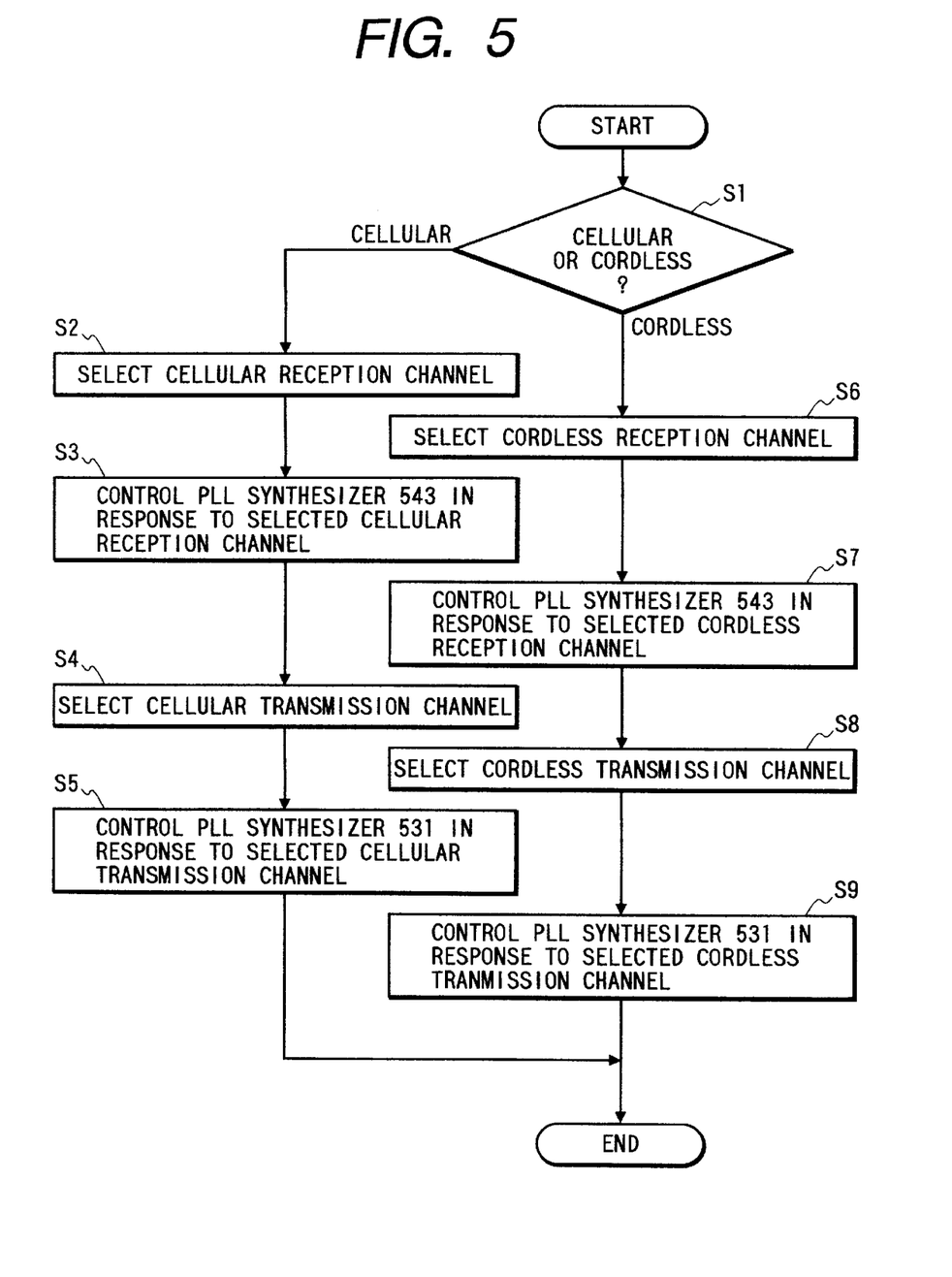
FIG. 5 is a flowchart of a segment of a program related to operation of a controller in FIG. 2.

As previously indicated, the controller 6 operates in accordance with a program stored in its internal ROM. FIG. 5 is a flowchart of a segment of the program which relates to control of the PLL synthesizers 531 and 543. In general, this program segment is periodically iterated.

As shown in FIG. 5, a first step S1 of the program segment decides whether the currently-selected mode of operation agrees with the cellular telephone mode or the cordless telephone mode. When the currently-selected mode of operation agrees with the cellular telephone mode, the program advances from the step S1 to a step S2. On the other hand, when the currently-selected mode of operation agrees with the cordless telephone mode, the program advances from the step S1 to a step S6.

The step S2 selects one out of channels in the cellular reception band (869.04 MHz to 893.97 MHz) as a desired reception channel according to predetermined rules.

A step S3 following the step S2 sets reception frequency information in response to the desired reception channel selected by the step S2. The step S3 informs the PLL synthesizer 543 of the reception frequency information, and thereby controls the PLL synthesizer 543 so that the frequency of a signal receivable and acceptable by the receiver 54 will be equal to the desired reception channel in the cellular reception band (869.04 MHz to 893.97 MHz).

A step S4 subsequent to the step S3 selects One out of channels in the cellular transmission band (824.04 MHz to 848.97 MHz) as a desired transmission channel according to predetermined rules.

A step S5 following the step S4 sets transmission frequency information in response to the desired transmission channel selected by the step S4. The step S5 informs the PLL synthesizer 531 of the transmission frequency information, and thereby controls the PLL synthesizer 531 so that the frequency of the RF signal generated by the PLL synthesizer 531 will be equal to the desired transmission channel in the cellular transmission band (824.04 MHz to 848.97 MHz). After the step S5, the current execution cycle of the program segment ends.

The step S6 selects one out of channels in the cordless reception band (902.1 MHz to 903.87 MHz) as a desired reception channel according to predetermined rules.

A step S7 following the step S6 sets reception frequency information in response to the desired reception channel selected by the step S6. The step S7 informs the PLL synthesizer 543 of the reception frequency information, and thereby controls the PLL synthesizer 543 so that the frequency of a signal receivable and acceptable by the receiver 54 will be equal to the desired reception channel in the cordless reception band (902.1 MHz to 903.87 MHz).

A step S8 subsequent to the step S7 selects one out of channels in the cordless transmission band (926.1 MHz to 927.87 MHz) as a desired transmission channel according to predetermined rules.

A step S9 following the step S8 sets transmission frequency information in response to the desired transmission channel selected by the step S8. The step S9 informs the PLL synthesizer 531 of the transmission frequency information, and thereby controls the PLL synthesizer 531 so that the frequency of the RF signal generated by the PLL synthesizer 531 will be equal to the desired transmission channel in the cordless transmission band (926.1 MHz to 927.87 MHz). After the step S9, the current execution cycle of the program segment ends.

Second Embodiment

Figure 6:
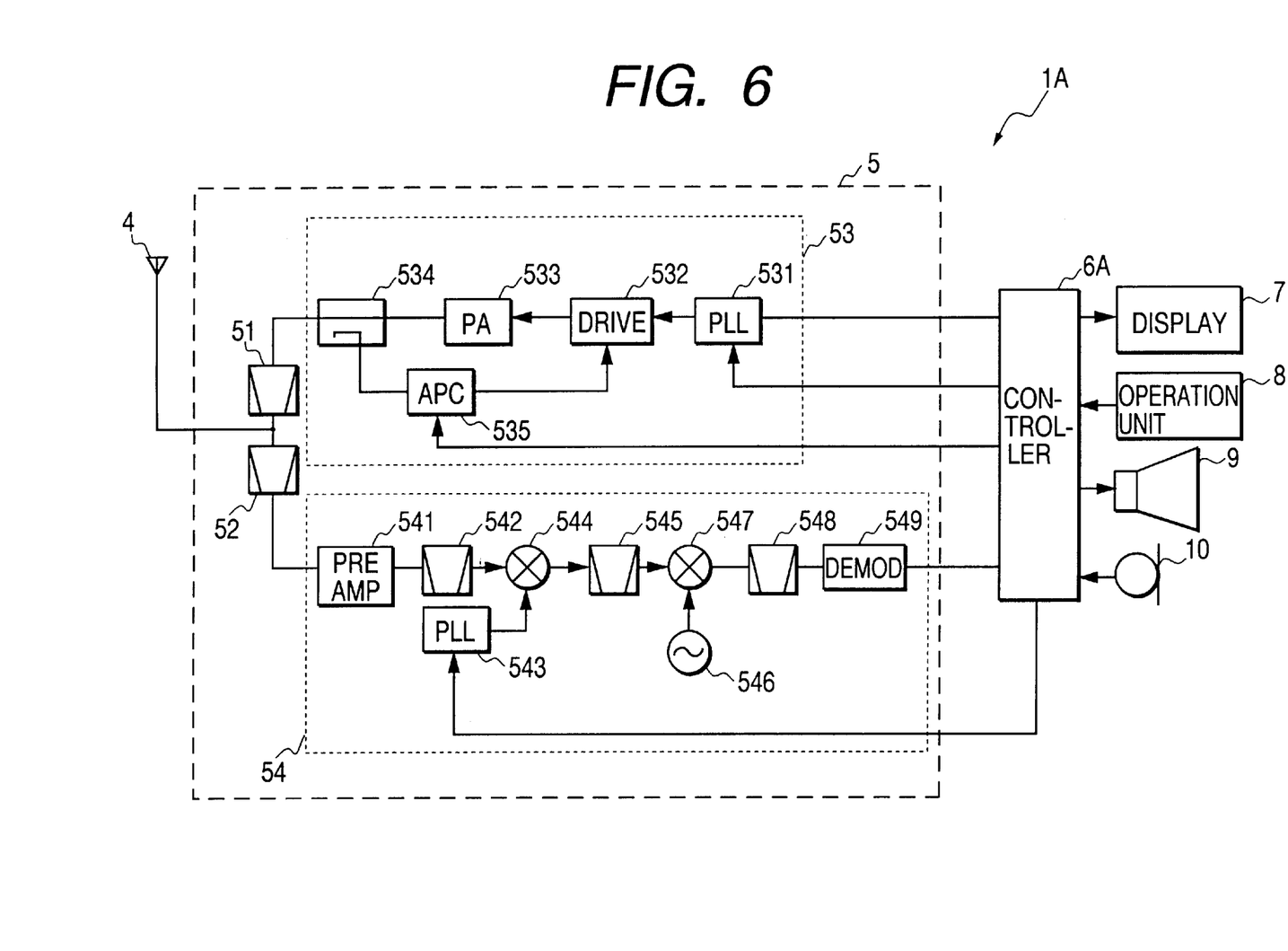
FIG. 6 is a block diagram of a cellular cordless telephone set in a second embodiment of this invention.

FIG. 6 shows a cellular cordless telephone set 1A which is similar to the cellular cordless telephone set 1 in FIG. 2 except for additional design features indicated later. The cellular cordless telephone set 1A of FIG. 6 includes a controller 6A instead of the controller 6 in FIG. 2.

During a stand-by mode of operation, the cellular cordless telephone set 1A is ready to automatically accept either a cellular call or a cordless call. To this end, the cellular cordless telephone set 1A acquires and maintains both the synchronization with the cellular base station 2 (see FIG. 1) and the synchronization with the cordless telephone fixed set 3 (see FIG. 1).

The cellular base station 2 (see FIG. 1) iteratively transmits a control RF signal representing a control message containing sync information, call incoming information, and individual base-station information. Generally, such a cellular control RF signal is assigned to a predetermined control channel among the channels in the cellular frequency band. During the stand-by mode of operation of the cellular cordless telephone set 1A, the cellular control RF signal is received by the antenna 4 and is then fed to the receiver 54 before being demodulated into the control message by the receiver 54. The receiver 54 informs the controller 6A of the control message. The controller 6A recognizes sync information transmitted from the cellular base station 2 (see FIG. 1) which is contained in the control message. The controller 6A executes a process of acquiring and maintaining the synchronization with the cellular base station 2 (see FIG. 1) in response to the recognized sync information. Then, the controller 6A executes a process of replacing cellular control-message reception by cordless control-message reception, and a process of acquiring and maintaining the synchronization with the cordless telephone fixed set 3 (see FIG. 1).

Figures 7A, 7B:
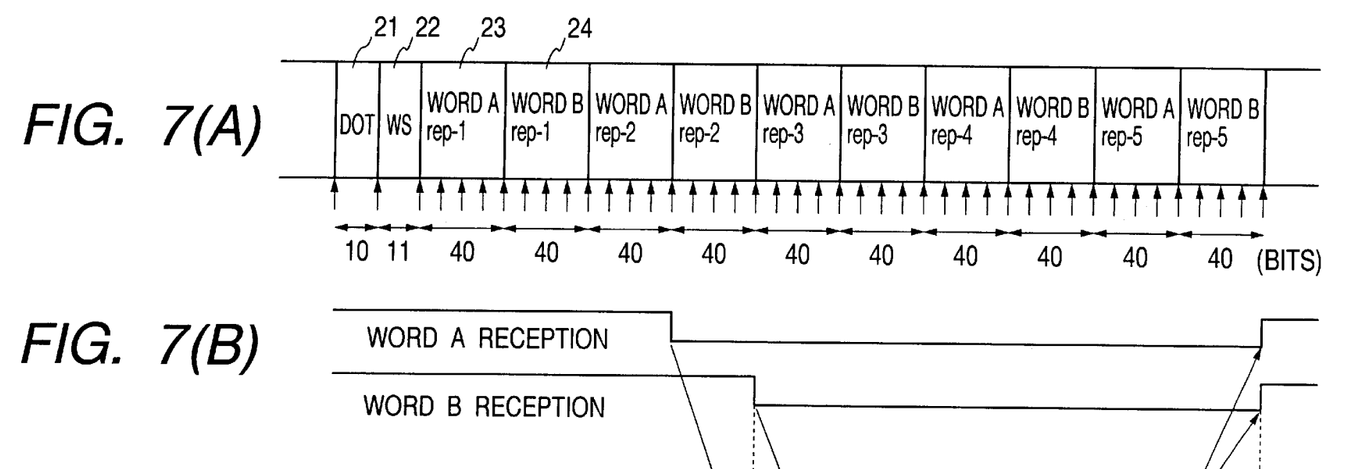
FIG. 7(A) is a time-domain diagram of a cellular control message.
FIG. 7(B) is a time-domain diagram of reception of words of the cellular control message in FIG. 7(A).

The control message transmitted from the cellular base station 2 (see FIG. 1) is of a predetermined format. As shown in FIG. 7(A), an example of the control message transmitted from the cellular base station 2 has a sequence of a 10-bit (lotting signal 21 and a 11-bit word sync signal 22. The word sync signal 22 is followed by the alternation of five 40-bit A-system message words 23 and five 40-bit B-system message words 24. Fort-two 1-bit busy/idle signals are added to the control message at time positions denoted by the arrows in FIG. 7(A). The resultant sequence of 463 bits in the control message forms one frame. In the AMPS system, since the baud rate is equal to 10 kbps, the time length of one frame of a control message is equal to 46.3 ms.

The cordless telephone fixed set 3 (see FIG. 1) iteratively transmits a control RF signal representing a control message containing sync information and call incoming information. Such a cordless control RF signal is assigned to a predetermined control channel among the channels in the cordless frequency band. The cordless control RF signal is received by the antenna 4 and is then fed to the receiver 54. While the cellular cordless telephone set 1A remains operating in the stand-by mode, the receiver 54 is controlled by the controller 6A so that the receiver 54 will demodulate the RF signal into the control message during a given time period determined by the controller 6A. The controller 6A executes a process of acquiring and maintaining the synchronization with the cordless telephone fixed set 3 (see FIG. 1) in response to the control message.

The controller 6A is programmed to repetitively implement the following processes while the cellular cordless telephone set 1A remains operating in the stand-by mode. During reception of a control message from the cellular base station 2 (see FIG. 1), the controller 6A compares a first received message word and a second received message word which originate from a same message word. When the first received message word and the second received message word agree with each other, the controller 6A uses related received data as effective data. In this case, the controller 6A executes cellular timing control in response to the effective data to acquire and maintain the synchronization with the cellular base station 2 (see FIG. 1). Then, the controller 6A changes the receiver 54 to receive a control RF signal of the control channel in the cordless frequency band. Thus, a control RF signal transmitted from the cordless telephone fixed set 3 (see FIG. 1) is received by the receiver 54, and is demodulated into a control message thereby. The controller 6A recognizes sync information transmitted from the cordless telephone fixed set 3 (see FIG. 1) which is contained in the control message. The controller 6A executes a process of acquiring and maintaining the synchronization with the cordless telephone fixed set 3 (see FIG. 1) in response to the recognized sync information. Then, the controller 6A changes the receiver 54 to receive a cellular control RF signal representing a control message.

On the other hand, when the first received message word and the second received message word from the cellular base station 2 (see FIG. 1) disagree with each other, the controller 6A enables the receiver 54 to receive a third message word. Then, the controller 6A compares the second received message word and the third received message word, and executes processes similar to the previously-indicated processes. When the first received message word and the second received message word disagree with each other, the controller 6A may disregard the present control message and control the receiver 54 to wait for a next cellular control message.

Figure 7C:
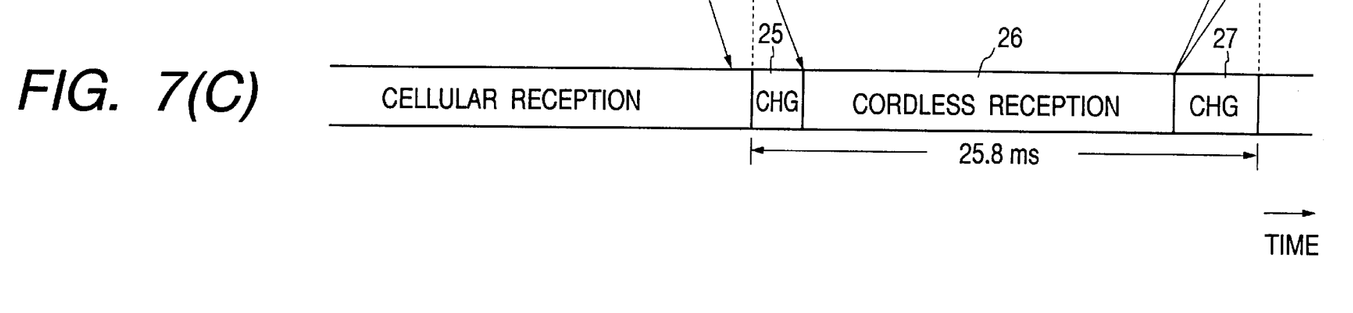
FIG. 7(C) is a time-domain diagram of the state of a receiver in FIG. 6.

With reference to FIGS. 7(A), 7(B), and 7(C), after a first A-system message word and a second A-system message word from the cellular base station 2 (see FIG. 1) are recovered, the controller 6A compares the first A-system message word and the second A-system message word with each other. When a first B-system message word and a second B-system message word from the cellular base station 2 (see FIG. 1) have been recovered, a given transition time period 25 for change from cellular control-message reception to cordless control-message reception is started. During the transition time period 25, the controller 6A compares the first B-system message word and the second B-system message word with each other. In the case where the first A-system message word and the second A-system message word agree with each other and the first B-system message word and the second B-system message word agree with each other, the controller 6A executes steps to replace cellular control-message reception by cordless control-message reception during the transition time period 25. When the transition time period 25 has elapsed, the receiver 54 falls into a state of receiving a cordless control message. During a given time period 26 following the transition time period 2E5, the reception of the cordless control message is executed to acquire and maintain the synchronization with the cordless telephone fixed set 3 (see FIG. 1). The cordless reception time period 26 is followed by a given transition time period 27 for return from cordless control-message reception to cellular control-message reception. During the transition time period 27, the controller 6A executes steps to replace cordless control-message reception by cellular control-message reception. When the transition time period 27 has elapsed, the receiver 54 returns to a state of receiving a cellular control message.

It is preferable that the sum of the lengths of the transition time period 25, the cordless reception time period 26, and the transition time period 27 is equal to or shorter than 25.8 ms. To provide matching between a timing of change from cellular control-message reception to cordless control-message reception and a timing of reception of a cordless control message, it is preferable that a cordless control message and a cellular control message are equal to each other in 1-frame time length.

Figure 8:
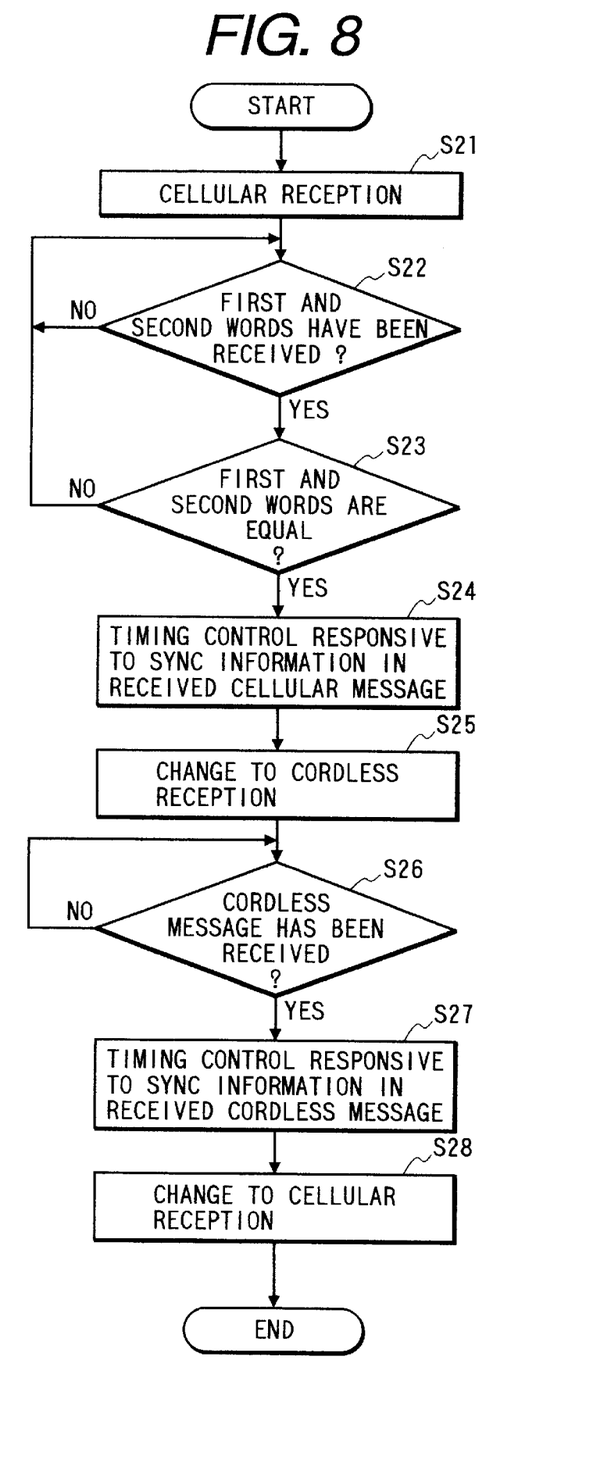
FIG. 8 is a flowchart of a segment of a program related to operation of a controller in FIG. 6.

The controller 6A operates in accordance with a program stored in its internal ROM. FIG. 8 is a flowchart of a segment of the program which relates to change between cellular control-message reception and cordless control-message reception during the stand-by mode of operation of the cellular cordless telephone set 1A. In general, this program segment is periodically iterated.

As shown in FIG. 8, a first step S21 of the program segment controls the receiver 54 to receive a cellular control message. After the step S21, the program advances to a step S22.

The step S22 decides whether or not first and second message words originating from a same message word have been received. When the first and second message words have been received, the program advances from the step S22 to a step S23. Otherwise, the step S22 is repeated.

The step S23 decides whether or not the first and second message words are equal to each other. When the first and second message words are equal to each other, the program advances from the step S23 to a step S24. Otherwise, the program returns from the step S23 to the step S22.

The step S24 subjects the receiver 54 to timing control responsive to sync information in the cellular control message to acquire and maintain the synchronization with the cellular base station 2 (see FIG. 1).

A step S25 following the step S24 changes the receiver 54 to receive a cordless control message. After the step S25, the program advances to a step S26.

The step S26 decides whether or not the cordless control message has been received. When the cordless control message has been received, the program advances from the step S26 to a step S27. Otherwise, the step S26 is repeated.

The step S27 subjects the receiver 54 to timing control responsive to sync information in the cordless control message to acquire and maintain the synchronization with the cordless telephone fixed set 3 (see FIG. 1).

A step S28 following the step S27 changes the receiver 54 to receive a cellular control message. After the step S28, the current execution cycle of the program segment ends.

What is claimed is:

1. A cellular cordless telephone set comprising:

a radio transceiver being common to cellular telephone and cordless telephone and being movable into and out of a stand-by state;

first means for making the radio transceiver ready to receive either a cellular telephone radio signal or a cordless telephone radio signal when the radio transceiver is in the stand-by state; and second means for, when the radio transceiver is in the stand-by state, changing the radio transceiver between a cellular control message reception mode of operation and a cordless control message reception mode of operation, wherein the radio transceiver receives a cellular control message from a cellular base station during the cellular control message reception mode of operation, and the radio transceiver receives a cordless control message from a cordless fixed set during the cordless control message reception mode of operation;

wherein the second means comprises means for deciding whether or not plural words in the received cellular control message are equal to each other; and means for changing the radio transceiver from the cellular control message reception mode of operation to the cordless control message reception mode of operation when the plural words in the received cellular control message are equal to each other.

2. A cellular cordless telephone set as recited in claim 1, wherein the cellular telephone radio signal is of an AMPS cellular system, and the cordless telephone radio signal is in an ISM frequency band.

\* \* \* \* \*